United States Patent [19]
Goetter et al.

[11] Patent Number: 5,644,671
[45] Date of Patent: Jul. 1, 1997

[54] OPTICAL FIBER SPICE CASE WITH CROSS CONNECT FEATURE

[75] Inventors: Erwin H. Goetter, Chesterland; Daniel J. Levac, Bellville, both of Ohio; Gary R. Krout, Tampa, Fla.

[73] Assignee: Preformed Line Products Company, Mayfield Village, Ohio

[21] Appl. No.: 493,925

[22] Filed: Jun. 23, 1995

[51] Int. Cl.⁶ .................................................. G02B 6/26
[52] U.S. Cl. ........................ 385/135; 385/136; 385/137
[58] Field of Search ................................ 385/134–137

[56] References Cited

U.S. PATENT DOCUMENTS

| | | | |
|---|---|---|---|
| Re. 34,955 | 5/1995 | Anton et al. | 385/135 |
| 4,039,742 | 8/1977 | Smith | 174/87 |
| 4,181,814 | 1/1980 | Smith | 174/92 |
| 4,314,094 | 2/1982 | Smith | 174/78 |
| 4,359,262 | 11/1982 | Dolan | 385/135 X |
| 4,424,412 | 1/1984 | Goetter et al. | 174/92 |
| 4,428,645 | 1/1984 | Korbelak et al. | 385/135 |
| 4,549,040 | 10/1985 | Goetter | 174/92 |
| 4,558,174 | 12/1985 | Massey | 174/92 |
| 4,620,815 | 11/1986 | Goetter | 403/405.1 |
| 4,666,240 | 5/1987 | Caron et al. | 385/135 |
| 4,679,896 | 7/1987 | Krafcik et al. | 385/135 |
| 4,687,289 | 8/1987 | DeSanti | 385/135 |
| 4,733,019 | 3/1988 | Pichler et al. | 174/92 |
| 4,743,209 | 5/1988 | Gittle | 439/521 |
| 4,799,757 | 1/1989 | Goetter | 385/135 |
| 4,805,979 | 2/1989 | Bossard et al. | 385/135 |
| 4,808,772 | 2/1989 | Pichler et al. | 174/92 |
| 4,927,227 | 5/1990 | Bensel, III et al. | 385/135 |
| 5,185,845 | 2/1993 | Jones | 385/135 |
| 5,245,133 | 9/1993 | DeCarlo et al. | 174/93 |
| 5,261,024 | 11/1993 | Allen et al. | 385/135 |
| 5,278,933 | 1/1994 | Hunsinger et al. | 385/135 |
| 5,285,515 | 2/1994 | Milanowski et al. | 385/135 |
| 5,323,478 | 6/1994 | Milanowski et al. | 385/135 |
| 5,323,480 | 6/1994 | Mullaney et al. | 385/135 |
| 5,402,515 | 3/1995 | Vidacovich et al. | 385/135 |
| 5,420,957 | 5/1995 | Burek et al. | 385/135 |
| 5,450,518 | 9/1995 | Burek et al. | 385/135 |
| 5,461,693 | 10/1995 | Pimpinella | 385/135 |
| 5,490,229 | 2/1996 | Ghandeharizadeh et al. | 385/135 |

*Primary Examiner*—Phan T. H. Palmer
*Attorney, Agent, or Firm*—Fay, Sharpe, Beall, Fagan, Minnich & McKee

[57] ABSTRACT

A housing assembly for enclosing and storing cable splices comprises axially spaced end plates defining a storage space and joined by a pair of rigid torque bars. A pair of opposed housing members contoured to enclose the end plates and the storage space are releasably and sealing clamped to each other and to the end plates. A connect panel for supplying connector couplings that receive connectors spliced to the glass fibers is connected to one of the rigid torque bars.

22 Claims, 4 Drawing Sheets

OPTICAL FIBER SPICE CASE WITH CROSS CONNECT FEATURE

BACKGROUND OF THE INVENTION

The subject invention is directed to a waterproof, pressurizable cable splice enclosure assembly. Assemblies of the type under consideration are particularly suited for enclosing and housing fiber optic cables, and the invention will be described with particular reference thereto.

Various types of fiber optic cable enclosures are known in the prior art. These prior enclosures are satisfactory to a greater or lesser degree but often have certain defects which make them inconvenient to use or prevent them from being readily adaptable to changing environments and conditions. One of these defects is the inability, subsequent to the initial assembly and hookup of the fibers in the fiber optic cable closure, to easily reroute the communication media by disconnecting one or more fiber optic connections and reconnecting the fibers in a different sequence. This inability is based upon the relatively permanent splicing of the fibers together such as by fusion of the glass fibers.

It is, accordingly, an object of the subject invention to provide a cable enclosure assembly that is easy to assemble and use and which can be rapidly modified or adapted for differing uses and can be formed in a variety of different sizes with trays and/or internal supports that allow the size and number of splices to vary widely. In addition, the subject invention provides an enclosure that allows ready access for changing or adding to the number of splices in the enclosure.

Furthermore, it is a primary object of the subject invention to provide a cable enclosure assembly that provides quick connect connection between fibers and allows ready access to the quick connect connections thereby providing the user with a system capable of having one or more fiber connections easily, rapidly and reliably disconnected and reconnected in a different sequence resulting in redirected communications running therein.

SUMMARY OF THE INVENTION

In accordance with the invention in general, there is provided a housing assembly for enclosing cable splices generally comprising a pair of housing members having main body portions with peripheral clamping flanges extending outwardly therefrom and cooperatively positioned in opposed relationship to be clamped together. A fiber connect panel is provided in the housing that provides quick connect connection between fibers and allows ready access to the connections and easy removability of the fibers from the connections. The user is thereby provided with a system capable of having one or more fiber connections easily, rapidly and reliably disconnected and reconnected in a different sequence to produce redirected communications running therein.

In accordance with a still further aspect of the invention, a housing assembly for enclosing and storing cable splices generally comprises first and second end plates axially spaced from one another and defining a storage space therebetween. A pair of opposed housing members are contoured to enclose the end plates and the storage space. The housing members are releasably and sealably clamped to each other and to the end plates. Two rigid torsion bar members extend through the storage space and have ends rigidly joined to the end plates. At least one of the rigid torsion bar members supports a fiber connect panel having connector couplings therein for receiving connectors spliced to a glass fiber from the fiber optic cable. Also carried by at least one of the torsion bar members are a pair of outwardly extending rods. A storage tray and a plurality of splice trays are arranged in stacked relationship to extend between the pair of rods. The trays have axially open end slots which receive the rods and are guided on the rods. Suitable connecting means on the rods are arranged for releasably clamping the stack of trays together and to the rigid torsion bar.

Preferably, and in accordance with a more limited aspect, the fiber connect panel in the housing assembly is a substantially planar panel positioned between the housing members in transverse relationship to the trays. The fiber connect panel includes apertures in which inserts or connector boards are positioned. Each of the connector boards has a plurality of connector couplings therein. Each connector coupling is capable of connecting two glass fibers together. On the end of each glass fibers is a quick connect connector for providing easy and quick connection with the connector coupling. These quick connect connectors allow disconnection from the connector coupling and reconnection to a different connector coupling thereby defining a different communication path.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
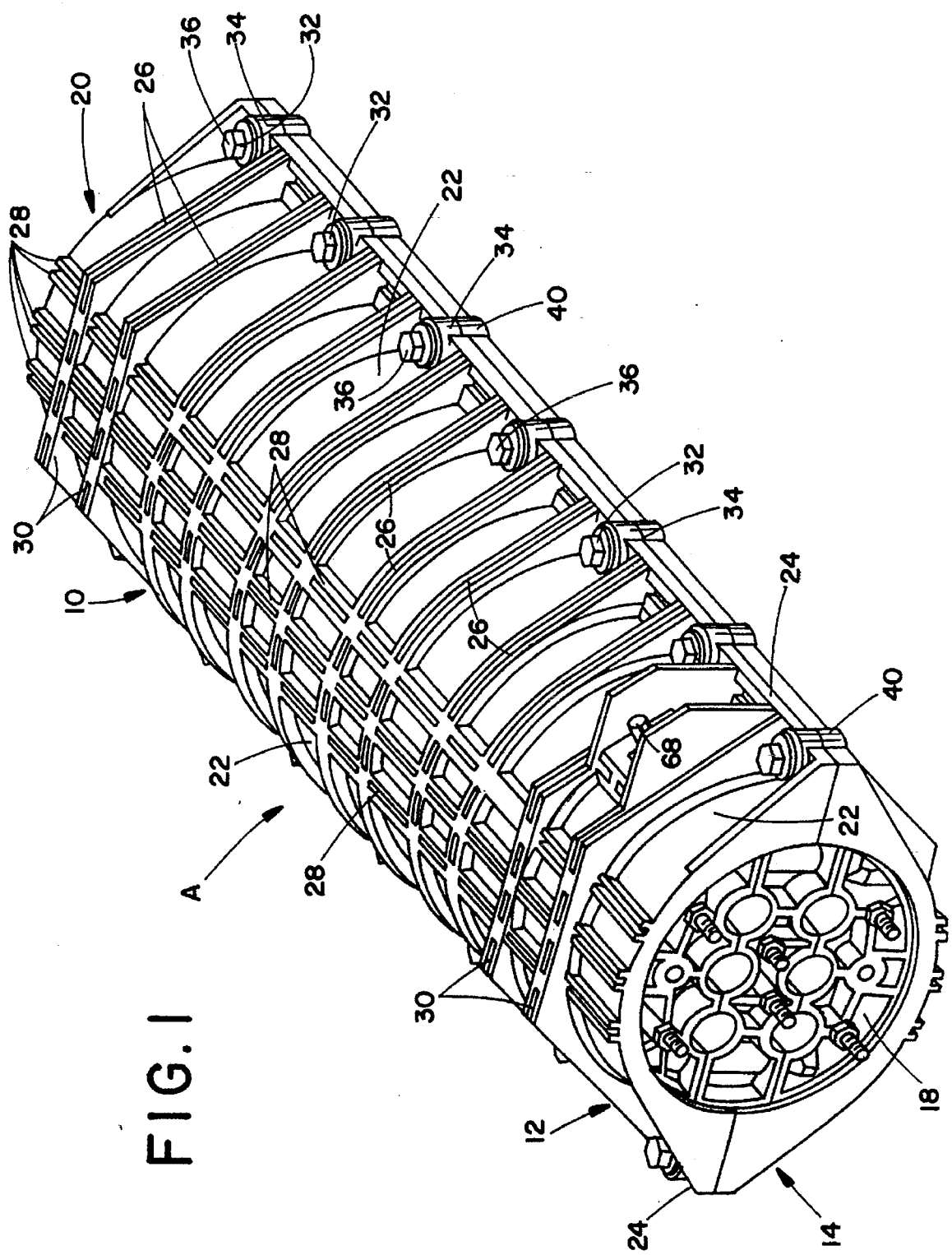
FIG. 1 is an isometric view of a preferred embodiment of a housing assembly intended for use in storing fiber optic cable splices.
Figure 2:
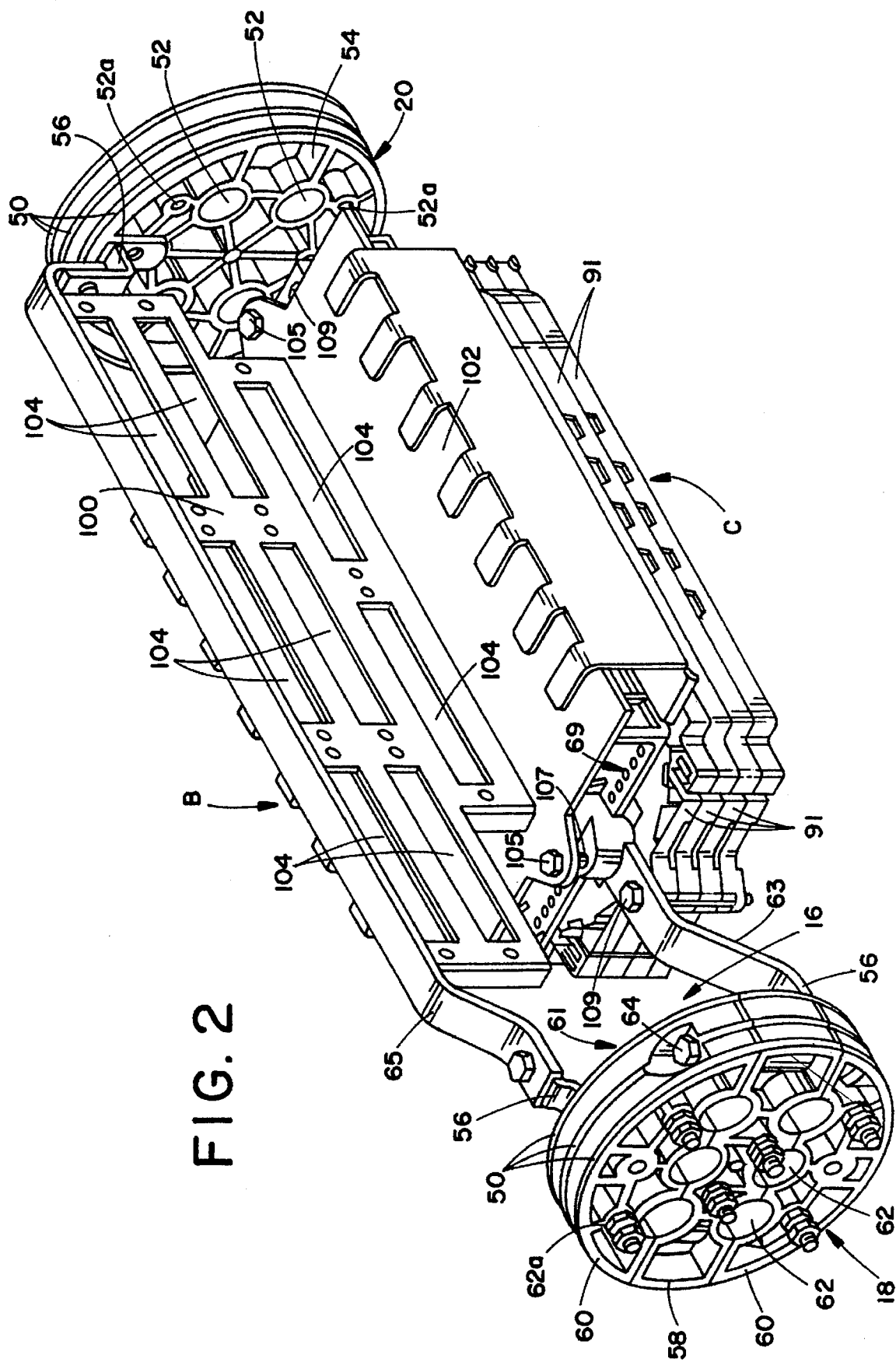
FIG. 2 is an isometric view of the assembly of FIG. 1 with the outer housing removed.

Referring now to the drawings wherein the showings are for the purposes of illustrating the preferred embodiment of the invention only and not for purposes of limiting same, the overall arrangement of the preferred construction of the splice case A can best be understood by reference to FIGS. 1 and 2. The overall arrangement of the fiber connect panel B in splice case A can best be understood by reference to FIGS. 2 and 4.

As illustrated in FIGS. 1 and 2, the main outer housing of splice case A comprises housing assembly 10 that houses and encloses the fiber connect panel B and a tray support assembly C. The housing assembly 10 is generally formed by a pair of closely similar, opposed main housing or body members 12 and 14 which are joined together in sealed clamping relationship to define an axially elongated central storage chamber 16. The opposite ends of the storage chamber 16 are closed by cylindrical end plate members 18 and 20 that are releasably and sealingly engaged with the main housing members 12 and 14 in a manner subsequently to be described.

Although the housing body components and the end plates could be formed from a variety of different materials using different manufacturing techniques, in the subject embodiment, they are preferably injection molded from a suitable plastic containing fibers for reinforcement. For example, fiber glass filled and reinforced polypropylene is preferred.

The two main housing members 12, 14 are closely similar in overall shape and construction. Accordingly, a description of the housing member 12 is to be considered as equally applicable to housing member 14 unless otherwise noted. In the embodiment under consideration, main housing member 12 has an elongated, semi-cylindrical configuration to define a somewhat shell-like body with a main outer semi-cylindrical wall 22 that has laterally extending clamping flanges 24 extending along each longitudinal side. The flanges 24 are in diametrical alignment relative to the wall 22 and define flat sealing and clamping surfaces that are continuous along each side. The main wall 22 is reinforced by radially extending, axially spaced ribs 26 formed integrally with the wall 22. Each of the ribs 26 extends circumferentially about the wall 22 and joins at its ends with the clamping flanges 24 as shown. In addition to the reinforcing ribs 26, there are preferably longitudinally extending ribs 28 which extend between the axial ends of wall 22 at the locations shown.

In order to facilitate assembly, disassembly, and use of the subject splice storage housing assembly 10, at least some of the ribs 26 are provided with a radially outer contour that allows the main body components 12, 14 to rest stably on a planar work surface. Referring to FIG. 1, it will be seen that the last two reinforcing ribs 26 at each end of the housing are each provided with a planar top surface 30 that is preferably in a plane parallel with the plane of the clamping surfaces of the clamping flanges 24. As can be appreciated, this allows the housings or body portions 12, 14 to rest on a planar work surface while the assembly is being assembled or while fiber optic cable splicing is being carried out and installed in the housing.

The clamping together of the main body components 12, 14 could be accomplished with a variety of different releasable fasteners or clamping means. In the subject embodiment, however, the preferred form comprises a plurality of threaded stud bolt members 32 carried in the housing body portion 12 and having their lower threaded ends extending downwardly through the associated clamping flange 24. In the form shown, the stud bolts 32 are uniformly spaced along the respective clamping flange 24 in molded bosses 34. Preferably, the heads 36 of the stud bolts 34 are retained in the bosses by capture rings that allow the studs to be rotated but do not allow them to be readily removed from their functional position in the associated bosses 34.

Referring in particular to body portion 14, the clamping flanges 24 of body portion 14 include openings that extend perpendicularly through the associated flange at locations corresponding to the stud bolts 32 carried by body member 12. Associated with each of the openings is a propeller nut member (not shown) that is captured in bosses 40 formed on the clamping flanges 24 of member 14. The two halves 12 and 14 can thus be clamped together by the stud bolts 32.

The clamping and sealing arrangement is based upon the longitudinally spaced axial ends of each of the body members 12 and 14 being provided with an inwardly extending end flange section that is provided with a central groove or recess configured and sized so as to receive the outer peripheral edge of the associated end plate 18 or 20. Associated with each of the recesses in the axial ends of each of the housing members 12 and 14 and the longitudinally extending clamping surfaces of the clamping flanges 24 on each of the housing members 12 and 14 is a resilient sealing gasket member.

Referring first to end plate 20 (see FIGS. 2 and 9), it will be noted that the plate 20 has a circular outer periphery of an axial width to be closely received in the recesses of the axial ends of each of the housing members 12 and 14. The plate 20 is a single, unitary molding and is provided with a continuous outer periphery having a plurality of outwardly extending sealing ribs 50 formed thereabout. Ribs 50 are arranged to sealingly engage with the gasket in the bottom of the recess in the axial end of each of the housing members 12 and 14. Suitable cable openings 52 are formed centrally of the end plate and any desired number could be provided. In the subject embodiment, there are four cable openings 52. Preferably, the openings 52 are normally sealed by molded-in knockout elements that can be driven from within the openings 52 when it is desired to use them. Suitable cross bracing and ribs extend between the outer circular periphery and the openings 52 and join integrally with the main disk wall 54. Spaced metal angle brackets 56 are shown bolted in position to the internal surface of the end plate 20. The purpose and functioning of the brackets 56 will subsequently be described.

Also formed in the end plate 20 are additional small openings 52a with one such opening associated with each cable opening 52. These openings provide a means for bolting cable strength member connecting brackets to the end plates in the manner and for the purpose to be described with reference to end plate 18.

The end plate 18 is closely similar in construction to end plate 20, but it is a three-part structure comprising a central section 58 and duplicate outer sections 60. The components are molded in the configuration shown and are arranged to define six cable through openings 62. The openings 62 can be of any desired size, either all of the same size or a variety of different sizes. In the subject embodiment, however, the four outer openings are of equal size and the two inner openings are smaller but equal in size to each other.

The components 58 and 60 are joined in the shape and configuration shown by a pair of tie bolts 64 extending through vertically aligned openings. The exterior sealing surfaces of the sections 58, 60 are provided with radially extending rib portions in the manner of ribs 50 previously described with respect to end plate 20. The use of the three-part end plate is, in some respects, preferred because it allows the cables to be placed in position prior to joining the end plate members if desired. Those openings 62 which are not to be used can, of course, be sealed with suitable plugs clamped in position or otherwise plugged. Preferably, the unit is provided with plugs having opposite ends of different sizes to correspond to the two different sized openings. This permits each plug to be used for plugging either sized opening.

Each opening 62 has a cable strength member bracket 61 and a connecting opening 62a (as is shown where bracket 61 is removed) associated therewith. The strength member connecting brackets serve to firmly anchor the cables to the closures and to isolate the splices and fibers from movements caused by expansion and contraction of the strength member.

The end plates 18 and 20 are rigidly joined in proper alignment and spaced apart relationship by metal torque or torsion bar members in the nature of tie rods 63, 65 that extend between the brackets 56 on each end plate. The lower bar member 63 is, of course, bolted to the lowermost bracket 56 on each end plate and the upper bar member 65 is releasably bolted parallel thereto between the upper pair of brackets 56. This arrangement makes the end plates and the tray support assembly into an independent, rigid, and unitary sub-assembly that does not depend on the outer housing members for its structural strength and integrity.

After the halves have been sealed and brought together with the end plates 18 and 20 therebetween, testing is possible to determine if an air and fluid tight seal has been achieved. Furthermore during use of the splice case in the field, such as buried underground, mounted underground, placed under water, mounted on a structure or pole, or suspended aerially, the splice case may be pressurized. For these reasons, the main body section 12 is provided with a pressurizing valve 68 as seen in FIG. 1.

Figure 3:
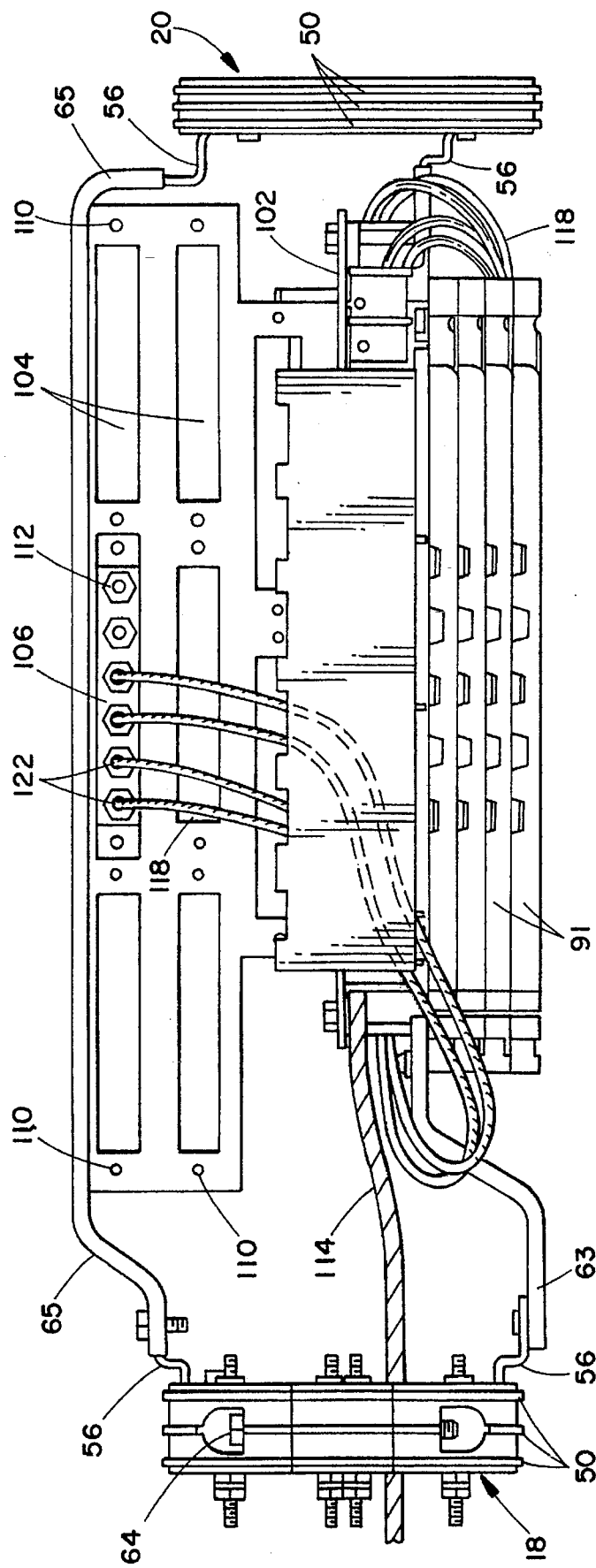
FIG. 3 is a side view of the assembly of FIG. 1 as shown in FIG. 2 with the outer housing removed.
Figure 4:
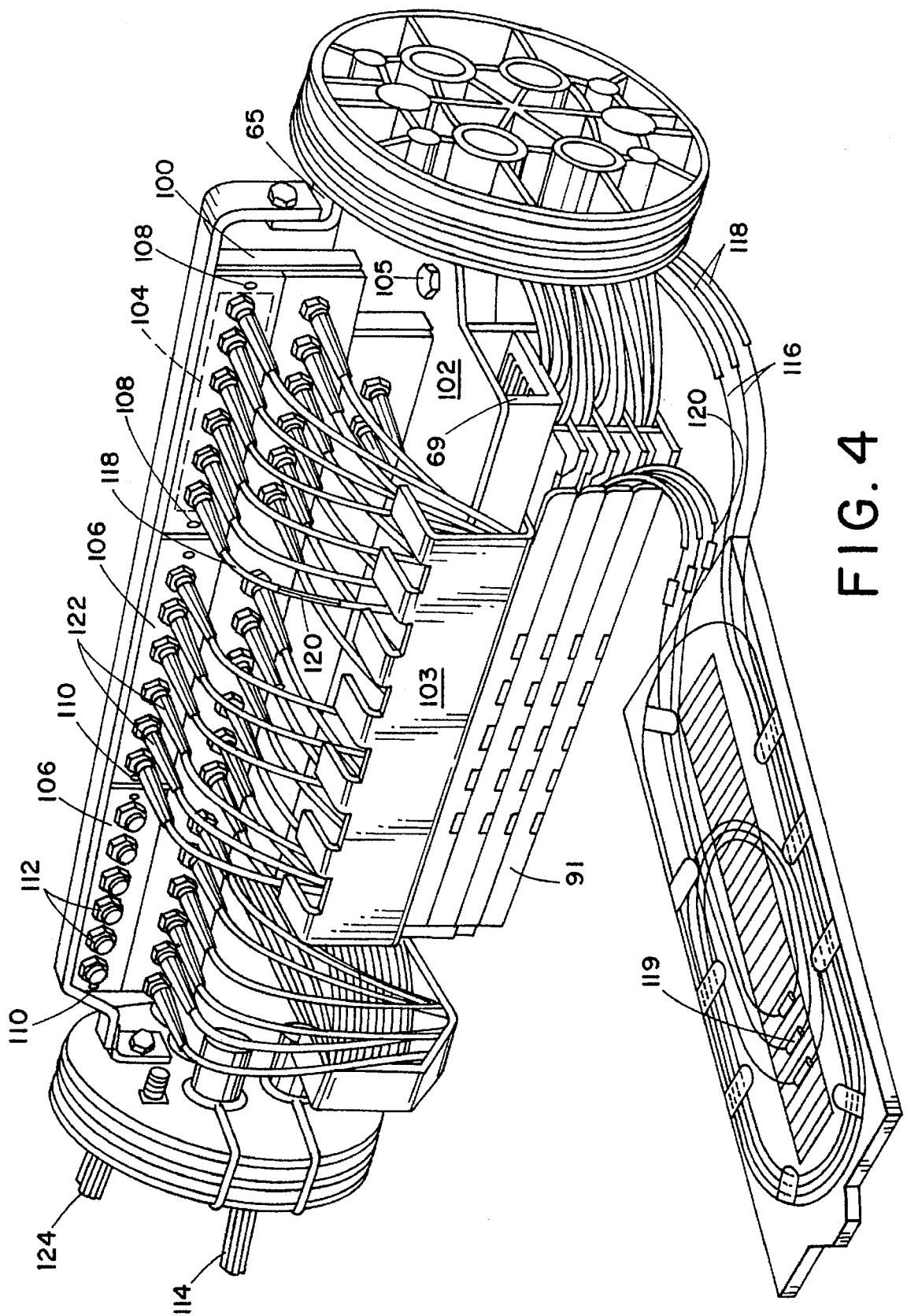
FIG. 4 is an isometric view of the assembly of FIG. 1 with actual fibers connected to the assembly.

As previously mentioned, mounted within the chamber 16 is tray support assembly C that carries a fiber optic storage receptacle for receiving, storing and protecting the fiber optic cable and the glass fibers therein, and housing any connections, extensions, or protective sheaths used in the splicing and fusing processes within the splice case. In the preferred embodiment, the fiber optic storage receptacle includes one or more splice trays and also makes provision for storage of excess cable such as in a storage tray 69. The preferred form is shown in FIGS. 2, 3 and 4.

Storage tray 69, as well as the superposed splice trays, are supported from the lower tie rod member 63 which connects between the bottom brackets 56 and is suitably connected thereto by releasable bolts. One or more of the splice trays 91 are positioned in stacked relationship below the storage tray 69 and function to hold in an organized manner the splice connections of the glass fibers to connectors, which are explained in more detail below. Although the splice trays could have a variety of configurations, the typical and preferred form for the trays in the subject embodiment is shown in FIGS. 2, 3 and 4.

The storage tray 69 provides a place where extra length of optical cable can be coiled and retained as may subsequently be needed for changing or adding splices. Extra length is required because every time a splice is broken and respliced, the following occurs: the glass fiber is cut or broken (either at the original fusion point or at another point along the glass fiber), the glass fiber is stripped (either additional insulation is removed from around the glass at the old splice point or insulation is removed from around the glass at the new break point, in either case thereby shortening the glass fiber some), the glass fiber is recleaved, and finally the glass fiber is respliced by fusion.

However, if eventually enough resplices occur, then this extra length is completely used up resulting in a need to either splice in a short extension or run a new glass fiber. Neither choice is particularly preferred since both are labor and capital intensive by requiring skilled fusion technicians to perform each and every splice using very expensive fusion equipment. In addition to the inconvenience and expense of breaking a spliced connection to reroute a current fiber optic connection, it is also inconvenient and expensive to connect via splicing and subsequently disconnect every season (or other cycle) at a location that needs communication lines on a temporary yet recurring basis such as for a telethon. A need exists for a quick connect system that allows both rerouting of fiber channels and connecting and subsequent disconnecting of channels.

Fiber connect panel B eliminates this repetitive resplicing that results from fusion splicing each reconnect and allows for temporary channels. Fiber connect panel B results in a one time fusing of the glass fibers followed by quick and easy disconnecting and reconnecting of quick connect connectors to redirect the light.

Fiber connect panel B includes a panel 100 transversely extending from and connected to a panel base 102. Panel 100 is substantially planar and longitudinally extends in axially elongated central storage chamber 16 substantially from cylindrical end plate member 18 to cylindrical end plate member 20. Panel base 102 is fastened to storage tray 69 by bolts (not shown) which are inserted from the tie rod 63 and through holes 107 in storage tray 69 and into holes 105 in base 102 where the storage tray is secured to the tie rod with double nuts while the remaining sections of the bolt extend beyond the panel base and are secured with a nut. The storage tray 69 is fastened using bolts 109 to tie rod 63 which extends beneath storage tray 69 from end plate 18 to end plate 20 and acts to support the storage tray 69. Panel base 102 also functions as a suitable cover 77 that is positioned over the storage tray 69 to provide additional protection for the cable stored therein. Panel base 102 acts as a divider by sequestering the spliced connections and most of the glass fiber in the bottom half of the optical fiber splice case while the quick connect connectors as described below are exposed above the panel base 102. In addition, panel 100 is supported and stabilized by tie rod 65.

This preferred form of panel 100 includes a plurality of longitudinally extending apertures 104 for holding inserts or connector boards 106. The connector boards 106 are attachable to the panel 100 such that each connector board 106 that is attached covers one of the apertures 104. In the preferred embodiment as is shown in FIG. 4, each connector board 106 has a pair of outwardly extending tabs 108 that each engage a tab receiving aperture 110 surrounding the apertures 104.

In the preferred embodiment as is shown in FIG. 4, each connector board 106 has six connector couplings 112 fastened therein. It is understood that any number of connector couplings may be fastened in the connector board since the only restriction is the size of the board and space limitations of the splice case as a whole. These connector couplings 112 may be permanently fastened into panel 106 or the couplings may be removably fastened in any one of a number of ways such as any form of snap fit or threaded fit. Each connector coupling 112 is capable of connecting at least two glass fibers together. The connector coupling 112 extends through panel 106 such that the coupling has one end extending out from each side of panel 106. Specifically, each connector coupling 112 is capable of receiving two connectors, one connector linked to at least one glass fiber is connectable to one end of connector coupling 112 and another connector linked to at least one other glass fiber is connectable to the other end of connector coupling 112.

The connector couplings 112 and the connectors on the end of each of the glass fibers could be any of a variety of different connector types and coupling types and formed from a variety of different materials using different manufacturing techniques. The connectors for instance may be FCPC type, ST type, FC type, and other known connectors in the fiber optic industry. The connector couplings must then be compatible with the connector type chosen so that the coupling is capable of connection with the connector such that the light traveling through the glass fiber passes through the connector coupling and into the glass fiber connected to the other side of the connector coupling.

One process of initially splicing a fiber optic cable using an optical fiber splice case and then subsequently redirecting the light projecting therein is as follows. A fiber optic cable 114 is routed through an optical fiber splice case A, more specifically, in one of the openings 52 or 62 through storage chamber 16 into storage tray 69 and then back out through storage chamber 16 and out one of the openings 52 and 62. At least one glass fiber in the fiber optic cable as it passes through storage tray 69 is then cut. The glass fiber 116 is run through a protective sheath 118 which protects the fragile glass fiber in between the storage tray 69 and one of the splice trays 91, particularly through bending of the glass fiber. More than one glass fiber may be run through the protective sheath between the storage tray 69 and the splice trays 91. The end of the cut glass fiber is stripped of the thick outer layer thereon leaving only the glass fiber with a thin protective coating. That end is then cleaved (cleanly sliced or cut to make a smooth, clean end). Once in the protective sheath 118 and extended into the splice tray 91, the glass fibers 116 are separated from each other and each is fused at splice point 119 to a short glass fiber 120 which has a connector 122 on its other end. The short glass fiber extension 120 extends out of the splice tray 91 via a protective sheath (which may hold multiple glass fibers) and behind a cover 103 with tongues 129 in the axially elongated central storage chamber 16. The protective sheath ends, typically behind the cover 103 thereby allowing the multiple glass fibers previously contained therein to branch out to the separate connectors that are on the other end of each glass fiber. The thick outer layer remains on the glass fibers between the connector and the end of the protective sheath. The connector 122 is connectable to one of a plurality of connector couplings 112.

On the opposite end of the connector coupling, a second short glass fiber extension that is fused to a glass fiber in a similar manner in another of the splice trays is connectable to the other end of the connector coupling 112. This glass fiber that is fused with the second short glass fiber extension is connected to another fiber optic cable in storage tray 69 and spliced to the second short fiber extension in one of the splice trays 91. This fiber optic cable extends out of the optical fiber splice case via one of the openings 52 or 62 and either is a distribution leg of up to 48 fibers (the splicing capacity of this invention) with the remainder of the 96 glass fibers continuing on unspliced through the housing assembly as a feeder cable, or alternatively all of the glass fibers continue on as a feeder or main run where the splice case was only used to connect ends of whole fiber optic cables (in this case, two sequential adjacent housing assemblies would be needed since only ½ of the 96 fibers in a standard cable can be spliced in one housing assembly).

A plurality of glass fibers each fused to connectors are connected to connector couplings within the optical fiber splice case. If a redirecting of the light traveling in one of the glass fibers is desired, that respective connector 122 merely needs to be unconnected from the connector coupling 112 such as by pulling it out, unsnapping it, unlocking it, twisting it, etc., and then reconnected to a different connector coupling 112.

Clearly it is advantageous with this design to perform all of the potential fusion of fibers to connectors during the initial installation so that subsequently any redirection or additional hookups merely require a simple disconnect and reconnect using standard connectors and connector couplings. This advantage results in a significant cost and time savings since the subsequent job merely requires a lesser grade of technician who merely disconnects and reconnects versus requiring a highly trained fusion expert with very costly equipment.

Furthermore, the fixed connector couplings 112 on the panel 100 in conjunction with the short glass fiber extensions having connectors thereon allow indicators 125 of source and destination to be placed on the connectors, connector couplings, and/or panel for quick and clear indications of the source and/or destination of each glass fiber. These indicators or indicia 125 could be any form of numbers, letters, or symbols. These numbers, letters, or symbols are typically correlated to a more complete indicator of source of destination such as addresses, telephone numbers, or a record book or database.

The cover 103 is supported from base 102 by spaced supports (not shown). It functions to protect the glass fibers between the splice trays 91 and the panel 100. Specifically, cover 103 receives the glass fibers in protective sheaths from the splice trays and routes them along panel base 102 to both keep them out of the area adjacent the panel 100 and protect the wires from contact and bending which can disrupt light transmission. The tongues 129 that extend out from cover 103 also provide bend and location control over the glass fibers. Once a glass fiber is routed in between the tongues 129, that fiber will not slide or move along cover 103 thereby becoming tangled with many other fibers. Typically, the end of the protective sheath is behind the cover 103 such that the thick outer layer is on the portion of the glass fiber extending between the cover 103 and the panel 100.

The panel 100 as shown is contemplated to have a 48 splice capacity based upon having 48 connectors. The panel as is shown is contemplated to have eight connector boards 106 therein. Each of the connector boards 106 as shown is contemplated to have six connector couplings therein or have apertures for inserting six connector couplings therein. Therefore, forty eight connector couplings are contemplated in this preferred embodiment. However, clearly numerous variations on splice count capacity, panel orientation and capacity, and connector board orientation and capacity are well within the scope of this disclosure.

If a standard fiber optic cable of for instance 96 glass fibers is used, this optical fiber splice case can splice with connectors up to one-half of the capacity of this cable. One embodiment of this splicing is handled as follows. As many as 48 glass fibers are cut from the fiber optic cable. Between one and a dozen or more glass fibers 116 are run through a protective sheath 118. These protective sheaths then extend to the splice trays 91 where each splice tray can receive multiple sheaths (in this embodiment four). The glass fibers 116 are separated from each other inside the splice tray, the ends of each of the cut glass fibers are stripped of the thick outer layer, cleaved as described above, and each is separately fused at splice point 119 to a short glass fiber 120. Between one and a dozen or more short glass fibers 120 are then run through a protective sheath 118. Each splice tray can handle multiple sheaths exiting therefrom typically in the same number as the sheaths it receives (in this embodiment four). These protective sheaths then extend to behind cover 103. The multiple glass fibers previously contained in each sheath exiting from each splice tray branch out to the separate connectors that are on the other end of each glass fiber. The thick outer layer remains on the glass fibers between the connector and the end of the protective sheath. Tongues 129 restrain movement of the glass fibers along the panel base 102. The connector 122 on the end of each glass fiber is connectable to one of a plurality of connector couplings 112. Similarly, the up to 48 glass fibers connected via the opposite ends of connector couplings 112 are connected.

The result is a 96 glass fiber cable entering the splice case where 48 glass fibers are cut away and stripped so that multiple glass fibers (up to a dozen or more) can be run through up to four protective sheaths to the splice tray where each fiber is spliced to a short fiber. These short fibers are then run through in multiples of a dozen or more one of up to four protective sheaths to behind the protective cover. At this point the glass fibers each exit the protective sheath and extend to a connector coupling where a connector attached to that end of the glass fiber is connected. The opposite occurs on the other side of the panel where the fiber optic cable the glass fibers converge upon exits the splice case as a distribution leg.

A preferred form of panel 100 is shown in FIGS. 2, 3, and 4 in a modified "T" shape; however, panel 100 may take any of a number of forms capable of connecting glass fibers. A preferred form of panel 100 is shown in FIGS. 2, 3, and 4 in a modified "T" shape; however, panel 100 may take any of a number of forms capable of connecting glass fibers. The panel 100 is "T" shaped to maximize the number of quick connect connectors available within the storage chamber 16. The "T" shape uses substantially all of the available longitudinal space between the end plates 18 and 20 along the rod 65 while providing protective sheath and fiber optic cable storage space near the panel base 102 due to its reduced length of merely the length of the storage tray 69 along the base 102. The result is that the fiber optic cables when extended from an end plate 18 or 20 to the storage tray 69, and the glass fibers when in a protective sheath 118 such as from the storage tray 69 to a splice tray 91, have sufficient area to properly extend and bend. This sufficient area to extend and bend reduces the risk of bending a glass fiber too much which results in interference or loss of transmission. At the same time, the panel 100 used all of the available space along tie rod 65 where sufficient area to bend glass fibers is not needed.

In the embodiment shown, in FIGS. 1–4, end plate 20 has four cable openings 52 and end plate 18 has six cable openings 62. If each fiber optic cable is of a standard size, for example 96 glass fibers, then potentially almost one thousand glass fibers could be run through this optical fiber splice case. However, not all of these will be spliced and used at this particular location, but if a significant number of splices is needed, the "T" shape maximizes connection capabilities and offers forty eight separate splice connections via connectors 122 that are subsequently quickly and easily disconnected, rerouted and reconnected.

Further details of the splice case A, the main housing members 12 and 14, the end plates 18 and 20, the storage tray 69, splice trays 91, and other parts can be found in commonly owned U.S. patent application Ser. No. 08/426,624, filed on Apr. 20, 1995, and hereby incorporated by reference.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A housing assembly for enclosing and storing fiber optic cable splices comprising:

first and second end plates axially spaced from one another and defining a storage space therebetween;

a pair of opposed housing members contoured to enclose the end plates and the storage space, said housing members being releasably and sealably clamped to each other and to said end plates;

a fiber optic storage receptacle in the storage space; and, a fiber optic connect panel in the storage space.

2. The housing assembly as set forth in claim 1 further comprising:

a first rigid bar extending through the storage space with its ends rigidly joined to the end plates and supporting the fiber optic connect panel.

3. The housing assembly as set forth in claim 2 further comprising:

a second rigid bar positioned in spaced apart parallel relationship to the first rigid bar and extending through the storage space with its ends rigidly joined to the end plates, and stabilizing the connect panel which longitudinally extends along the second rigid bar substantially from the first end plate to the second end plate.

4. The housing assembly as set forth in claim 3 wherein the connect panel is "T" shaped.

5. The housing assembly as set forth in claim 4 wherein the "T" shaped connect panel includes an upper section extending along the second rigid bar substantially from the first end plate to the second end plate and a lower section extending along the first rigid bar substantially the length of the fiber optic storage receptacle.

6. The housing assembly as set forth in claim 1 further comprising:

a first rigid bar extending through the storage space and having its ends rigidly joined to the end plates.

7. The housing assembly as set forth in claim 6 further comprising:

a second rigid bar positioned in spaced apart parallel relationship to the first rigid bar and extending through the storage space with its ends rigidly joined to the end plates, the fiber optic storage receptacle joined to the first rigid bar and the connect panel joined to at least one of the first and second rigid bars.

8. The housing assembly as set forth in claim 1 further comprising:

a plurality of connection couplings removably held within the connect panel and each capable of connecting at least two fiber optic cable splices.

9. The housing assembly as set forth in claim 8 further comprising:

a plurality of inserts connectable to the connect panel and each containing the plurality of connector couplings.

10. The housing assembly as set forth in claim 8 further comprising:

a fiber optic cable having a plurality of glass fibers therein and extending into the storage space through one of the end plates;

a second fiber cable having a plurality of glass fibers therein and extending into the storage space through one of the end plates; and a plurality of connectors each connected to an end of one of a plurality of glass fibers in one of the fiber optic cables and connectable to one of the plurality of connection couplings.

11. The housing assembly as set forth in claim 1 further comprising a panel base from which the connect panel transversely extends.

12. The housing assembly as set forth in claim 1 further comprising:

a plurality of inserts connectable to the connect panel.

13. The housing assembly as set forth in claim 1 further comprising:

a plurality of inserts connectable to the connect panel and containing a plurality of connector couplings.

14. The housing assembly as set forth in claim 1 wherein the fiber optic storage receptacle comprises a storage tray and at least one splice tray in stacked relationship and extending between the pair of rods.

15. The housing assembly as set forth in claim 1 wherein the end plates have a generally circular configuration and said housing members have a generally semi-cylindrical configuration with peripheral clamping flanges extending generally radially therefrom.

16. The housing assembly as set forth in claim 1 wherein said housing members are releasably and sealingly clamped to each other and to said end plates by bolts extending through the clamping flanges.

17. The housing assembly as set forth in claim 1 wherein said housing members and said end plates are molded of a fiber reinforced resinous material.

18. The housing assembly as set forth in claim 1 further comprising glass fiber connection indicia.

19. A housing assembly for enclosing and storing fiber optic cable splices comprising:

a housing defining a fiber optic storage space therein, said housing including a pair of axially spaced end plates and a pair of opposed housing members contoured to enclose the end plates and the storage space;

seal means between the housing members for preventing entry of moisture into the fiber optic storage space;

at least one fiber optic storage receptacle in the storage space; and, a connect panel in the storage space.

20. The housing assembly as set forth in claim 19 wherein the connect panel includes means for holding a plurality of inserts.

21. The housing assembly as set forth in claim 20 wherein each insert has a plurality of connection couplings removably held within the insert and each capable of connecting at least two fiber optic cable splices.

22. The housing assembly as set forth in claim 19 further comprising:

a plurality of connection couplings removably held within the connect panel and each capable of connecting at least two fiber optic cable splices.

* * * * *